United States Patent [19]
Capehart

[11] Patent Number: 5,855,378
[45] Date of Patent: Jan. 5, 1999

[54] ELEVATOR SUSPENSION AND METHOD OF USE

[76] Inventor: Jeffrey L. Capehart, 11505 Pin Oak Dr., Oakdale, Calif. 95361

[21] Appl. No.: 728,543

[22] Filed: Oct. 9, 1996

Related U.S. Application Data

[63] Continuation-in-part of Ser. No. 519,881, Aug. 23, 1995, abandoned.

[51] Int. Cl.[6] .............................. B60G 3/14; B60G 11/14; B60P 1/18

[52] U.S. Cl. ..................................... 280/43.11; 280/43.18; 280/43.23; 280/124.132; 280/124.179; 414/474

[58] Field of Search .............................. 280/43.18, 43.23, 280/43.11, 43.17, 43.22, 704, 725, 724, 713, 711, 701, 698, 690, 688, 6.12, 124.128, 124.132, 124.179, 124.157, 124.127, 6.156, 86.5; 414/474

[56] References Cited

U.S. PATENT DOCUMENTS

| | | | |
|---|---|---|---|
| 2,644,696 | 7/1953 | Bill | 280/43.18 |
| 2,852,266 | 9/1958 | Wagner | 280/43.18 |
| 3,001,796 | 9/1961 | Martin | 280/43.18 |
| 3,356,386 | 12/1967 | Taylor | 280/724 |
| 3,784,218 | 1/1974 | Stone | 280/43.23 |
| 4,856,812 | 8/1989 | Stephens et al. | 280/713 |
| 4,878,691 | 11/1989 | Cooper et al. | 280/711 |

FOREIGN PATENT DOCUMENTS 964964  7/1964  United Kingdom ............... 280/43.23

*Primary Examiner*—Peter C. English
*Attorney, Agent, or Firm*—Ted Masters

[57] ABSTRACT

A fully independent suspension system (20) for a vehicle includes a plurality of components mounted above the bottom side (502) of the frame (500) of the vehicle so that the rear end (508) of the frame (500) may be selectively lowered to the roadway. In a preferred embodiment, the components are mounted on the longitudinal edges (510) and (512) of the frame (500). The suspension system (20) includes raising and lowering components for selectively lowering the rear end (508) of the frame (500) to the roadway, and raising the rear end (508) so that the frame (500) is substantially horizontal. The suspension system (20) retains the frame (500) in a position below the is rolling axis (65) of the wheel (514).

17 Claims, 5 Drawing Sheets

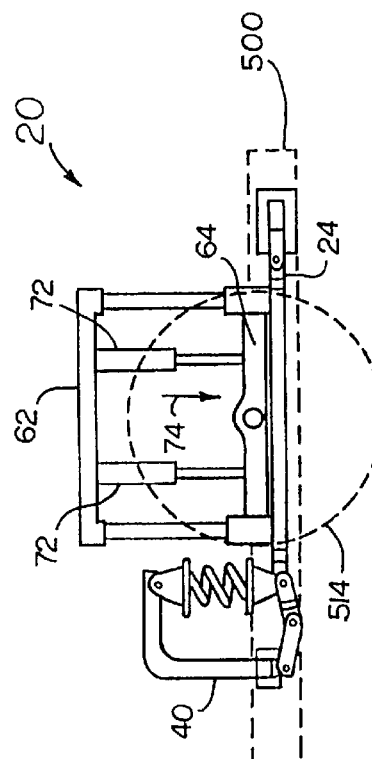
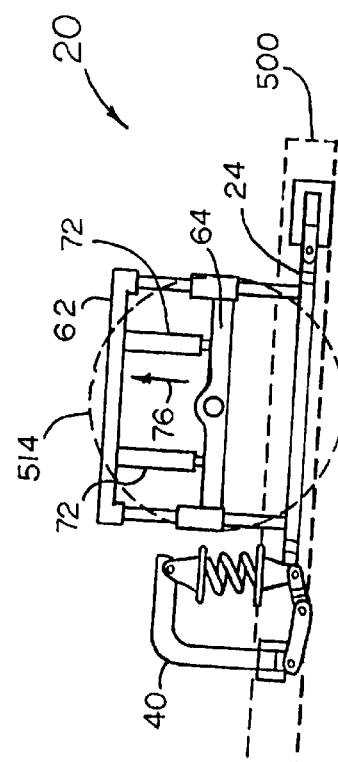
FIG. 4.
FIG. 5.

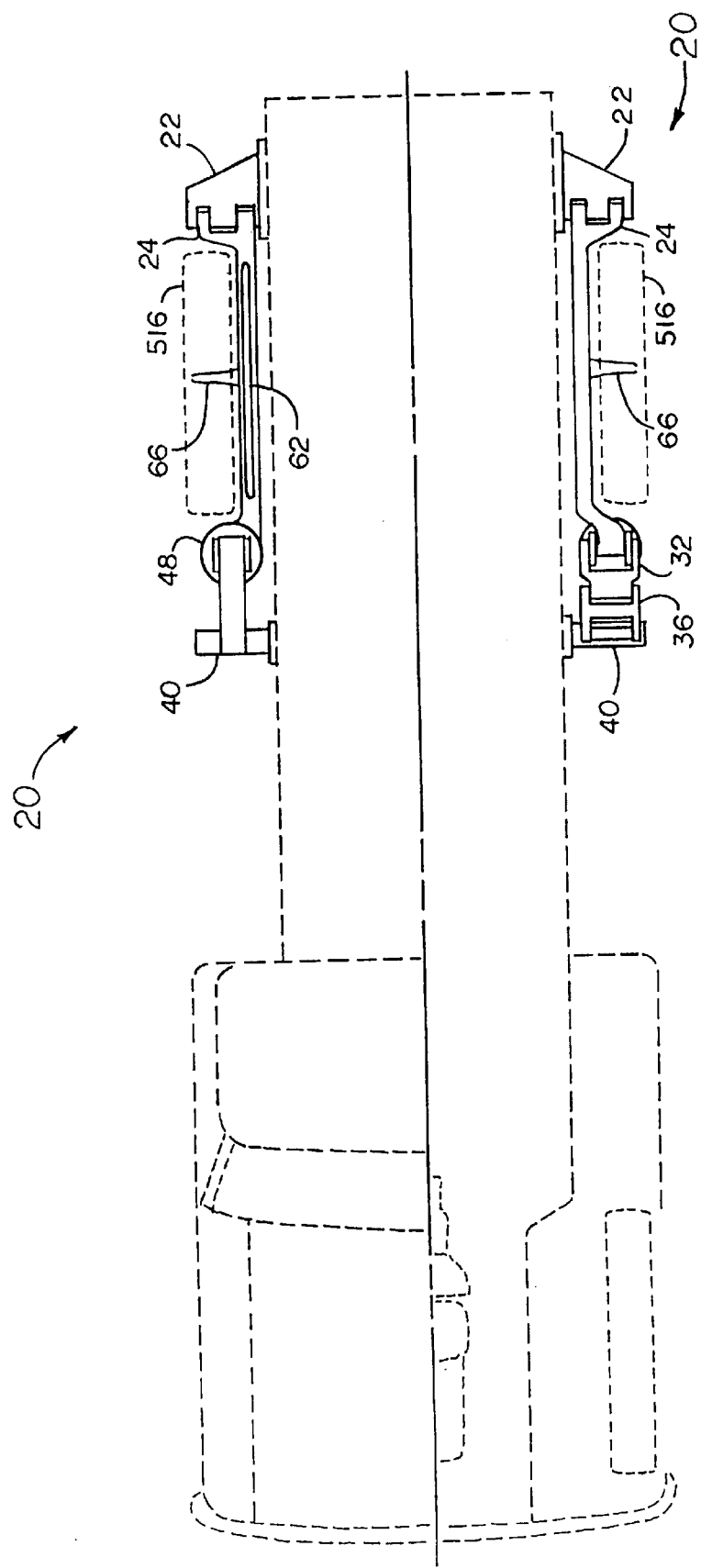

ELEVATOR SUSPENSION AND METHOD OF USE

CROSS-REFERENCE TO RELATED APPLICATION

This is a continuation-in-part of application Ser. No. 08/519,881, filed Aug. 23, 1995, now abandoned, the disclosure of which is incorporated herein by reference.

TECHNICAL FIELD

The present invention pertains to suspension systems for vehicles, and in particular to a suspension system which permits the frame of the vehicle to be (1) situated below the rolling axes of the wheels, and (2) to be selectively lowered to the roadway or raised to a substantially horizontal position.

BACKGROUND ART

The present invention relates to a suspension system for cargo-hauling vehicles of all sizes and types. Almost all present vehicles require that the cargo-receiving deck, which is mounted to the vehicle's frame, be situated above the vehicle's axle, drive-train, and/or suspension related hardware. This raises the deck to an undesirable height, thereby creating a high center of gravity, creating instability, and reducing the vertical distance available for cargo storage. The deck height of these vehicles also creates difficulties in cargo loading and unloading, requiring elevators attached to the vehicle, loading ramps, fork lifts, or loading docks. For example, U.S. Pat. No. 2,507,980 shows an independent wheel suspension for a trailer. The entire frame of the trailer is constructed of channel irons, and the wheels are rotatably arranged in wheel hangers pivotally secured to the trailer frame. U.S. Pat. No. 2,644,696 defines a convertible spring and hydraulic loading means for vehicles. The bed of the vehicle can be lowered to rest on the supporting surface such as a roadway, platform, or on the ground, thereby permitting convenient cargo loading and unloading. U.S. Pat. No. 2,852,266 depicts a retractable boat carrier or trailer. The boat carrier is adjustable to various sizes of boats wherein the wheels and struts are easily and quickly retracted into the boat when not in use. U.S. Pat. No. 3,001,796 discloses a retractable trailer uppercarriage for semi-type trailers and commercial carriers. The uppercarriage is removable from service without disassembly, and is constructed so that the running gears are two separate assemblies connected by one common hydraulic system. U.S. Pat. No. 3,356,386 comprises an underslung wheel suspension system for a trailer in which one end of a lever arm is pivotally engaged to the frame at its lower point and extends rearwardly into the wheel well and the free end of the lever bears against a coil spring in a spring receiver mounted on the frame at the rear of the wheel well. The wheel axle is mounted on a plate extending upward from the lever arm. U.S. Pat. No. 3,779,594 consists of a retractable wheel assembly wherein the frame is external and mates with the bottom of the body by engaging elongated channels formed therein. The frame serves to support the retractable wheel assembly and the detachable pontoon whereby stress and strain is isolated from the body. U.S. Pat. No. 3,784,218 describes a vehicle trailer having a frame pivotally mounted on wheels with a mechanical lock to lock the frame in a predetermined position in relation to the wheels and with fluid pressure means to release a mechanical lock and cushion lowering and to effect raising of the frame. The frame is adjustable in height relation to the wheels. U.S. Pat. No. 4,856,812 includes an axle suspension system that is soft in ride and stiff in roll. Two air bags are coupled between a beam and the frame. The two air bags carry substantially all the weight of the vehicle over the front axle. U.S. Pat. No. 4,878,691 evidences a trailer suspension apparatus for increasing the cargo capacity of the trailer. The apparatus includes a U-shaped frame having a transverse structure and upright structures at the ends of the traverse structure. The transverse structure is positioned beneath the rolling axes of the wheels to permit the trailer body to provide cargo space between the wheels and over the transverse structure. U.S. Pat. No. Re. 32,736 shows an alignment and elevating system for a vehicle load bed. The system includes a suspension system having a suspension support assembly pivotally mounted at one end of the load bed and releasably mounted at the second end of the load bed. Selective release of the second end allows pivotal separation of the load bed and suspension system. U.K. Pat. Document 2,042,433 defines an improved vehicle suspension system of the trailing arm type in which the arms are supported by the cooperative effort of primary and secondary springs. The suspension system comprises a frame including first and second spaced elongated side rail members and traversely extending interconnecting members secured to the side members, wheel mounting means adapted for the securement of ground engaging wheels, and a suspension means for movably mounting the wheel mounting means to the vehicle frame.

Since there are legal limits which regulate the height, length, and width of cargo-hauling vehicles, the only way to increase cargo capacity for a particular vehicle is to lower the frame and therefore the deck. This has the added advantage of lowering the vehicle's center of gravity, thereby increasing stability. This cannot usually be done with present technology due to drive-shafts, differentials, live axles, dead axles, and suspension components which are located beneath the frame and deck. Similarly, because of the presence of these under-frame components, present vehicles cannot lower one end of the frame to the roadway for easy and quick cargo loading and unloading. The present invention overcomes both of these problems by providing an independent suspension system with a lowered frame and attached deck which is situated below the rolling axes of the wheels, and by allowing the rear end of the frame to be lowered completely to the roadway using the front wheels as a pivot point.

DISCLOSURE OF INVENTION

The present invention is directed to a fully independent suspension system for a vehicle. The vehicle can be front or rear wheel driven, powered by internal combustion, electric, hydraulic, or other means, or could even be an unpowered trailer. The present invention can be used in single or multiple axle configurations. The present invention (1) permits the vehicle frame to be built as low as roadway conditions will permit by eliminating all suspension system components from underneath the frame of the vehicle, and (2) provides the ability to lower the rear of the vehicle frame completely to the roadway (ground, road, driveway, etc.) for loading and unloading cargo without the use of ramps, elevators, or loading docks. The suspension system components comprise a pair of control arms longitudinally attached at pivot points to the opposite sides (edges) of the frame of the vehicle, oriented substantially parallel to the frame and the rolling axes of the wheels, and allowing for up and down movement only of the control arm, but prohibiting lateral movement or twisting of the control arm. Each control arm is located between the frame and the wheel with an offset for wheel clearance, and is pivotally attached at its opposite end to a coil spring or airbag which is in line with the wheel. Also attached to the control arm at the point of the spring or airbag are two limiting control brackets that allow for up and down movement of the control arm with the spring or airbag, but eliminate lateral movement or twisting of the control arm. One control bracket is attached to the control arm at a pivot point, with the second control bracket attached to the frame at a second pivot point, with the two control brackets also joined together at a third pivot point. The hinging action of these two control brackets allows the control arm to swing through an arc from the pivot point at the frame, compressing or stretching the spring or airbag while prohibiting lateral movement of the control arm.

Rising from the control arm are two vertical shafts or legs spaced far enough apart so as to be near the opposite ends of the control arm, but not so near to the ends that they interfere with the spring or pivot point at the frame. These vertical legs slide up and down in a spindle arm having a substantially centered spindle which receives the wheel. At the uppermost end of the legs is a cross member to which one end of a hydraulic cylinder(s) is attached. The other end of the hydraulic cylinder is attached to the top of the spindle arm, thereby permitting the movement of the control arm in relation to the spindle arm. By retracting the hydraulic cylinder, the legs will drop down through the spindle arm in a vertical manner. By extending the hydraulic cylinder, the legs are driven back up bringing the control arm back together with the spindle arm. By locking the spindle arm and the control arm together, they will act as one unit. When the wheel encounters a bump in the roadway, the bump is transferred through the spindle arm to the control arm, which in turn transfers this energy to the spring or airbag in a normal suspension system fashion.

When the control arm is unlocked from the spindle arm, and the hydraulic cylinder is retracted, the legs drop down through the spindle arm. Since the spindle arm is attached to the wheel, the downward movement of the legs causes the frame of the vehicle to lower completely to the roadway, or to any intermediate position such as to a low dock or curb. Extending the hydraulic cylinder drives the control arm back together with the spindle arm, thereby raising the frame, so that the spindle arm and the control arm can be again locked together in a normal driving configuration. Since the spring or airbag, is positioned to be in line with the wheel and control arm on the side of the frame, all suspension system components are removed from underneath the frame, therefore allowing the frame and attached deck to be situated as low as possible to the roadway.

In accordance with a preferred embodiment of the invention, a vehicle resides upon a roadway, the vehicle has a frame having a front end and an opposite rear end, the frame further having a top side and an opposite bottom side, the frame further having a first longitudinal edge and an opposite second longitudinal edge. A suspension system comprises a plurality of components, the components are mounted on the frame such that all the components are situated substantially above the bottom side of the frame thereby permitting the rear end of the frame to be selectively lowered to the roadway. The suspension system includes a raising and lowering means for selectively lowering the rear end of the frame to the roadway and raising the rear end so that the frame is substantially horizontal.

In accordance with an important aspect of the invention, the suspension system further includes first and second control arms, the first control arm is pivotally connected to the frame adjacent to the first edge, the first control arm is oriented substantially parallel to the first edge, the second control arm is pivotally connected to the frame adjacent to the second edge, and the second control arm is oriented substantially parallel to the second edge.

In accordance with an important feature of the invention, the first control arm further includes a first end and an opposite second end, the first end is pivotally connected to a pivot bracket, the pivot bracket is connected to the frame.

In accordance with another important aspect of the invention, the second end of the first control arm is pivotally connected to a first control bracket, the first control bracket is pivotally connected to a second control bracket, the second control bracket is pivotally connected to a spring tower, and the spring tower is connected to the frame, the spring tower rising vertically from the frame.

In accordance with another important feature of the invention, the second end of the first control arm is also pivotally connected to a first spring saddle, the first spring saddle having an upwardly facing surface, the spring tower having an uppermost end, the uppermost end pivotally connected to a second spring saddle, the second spring saddle having a downwardly facing surface, and a suspension spring connected between the upwardly and downwardly facing surfaces.

In accordance with an important aspect of the invention, the vehicle further has a first wheel located near the first longitudinal edge of the frame. The raising and lowering means further including, the first control arm having a top surface, the top surface having two spaced upwardly projecting legs capped by a cross member. A spindle arm having a substantially centered spindle, the first wheel rotatably connected to the spindle. The spindle arm having a first end and an opposite second end, the spindle arm having two spaced sleeves, one sleeve located near the first end and the other sleeve located near the second end, the sleeves receiving and containing the legs so that the legs can freely slide through the sleeves. A positioning means is connected between the cross member and the spindle arm, the positioning means selectively controls the position of the legs within the sleeves, thereby vertically raising or lowering the spindle arm.

In accordance with an important feature of the invention, the positioning means further includes at least one hydraulic cylinder connected between the cross member and the spindle arm, so that when the hydraulic cylinder is retracted it urges the cross member toward the spindle arm thereby lowering the rear end of the frame of the vehicle to the roadway. Conversely, when the hydraulic cylinder is extended it urges the cross member away from the spindle arm thereby raising the rear end so that the frame is substantially horizontal.

In accordance with another important aspect of the invention, the suspension system further includes a locking means for selectively locking the legs in a fixed position within the sleeves.

In accordance with another important feature of the invention, the locking means further includes the sleeves and legs having holes sized to receive a locking pin, the locking pin sized for insertion into the holes in the legs and the sleeves so that the legs are locked in a fixed position within the sleeves.

In accordance with another feature of the invention, the vehicle further having a first wheel located near the first longitudinal edge, and a second wheel located near the second longitudinal edge, the first and second wheels having first and second rolling axes respectively, the suspension system retaining the frame in a position below the rolling axes.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 4 is a reduced side elevation view of the vehicle and suspension system, showing the frame in the raised position;

FIG. 5 is a reduced side elevation of the vehicle and suspension system, showing the frame in the lowered position; and, FIG. 6 is a split top plan view and bottom plan view.

BEST MODE OF CARRYING OUT THE INVENTION

Figure 1:
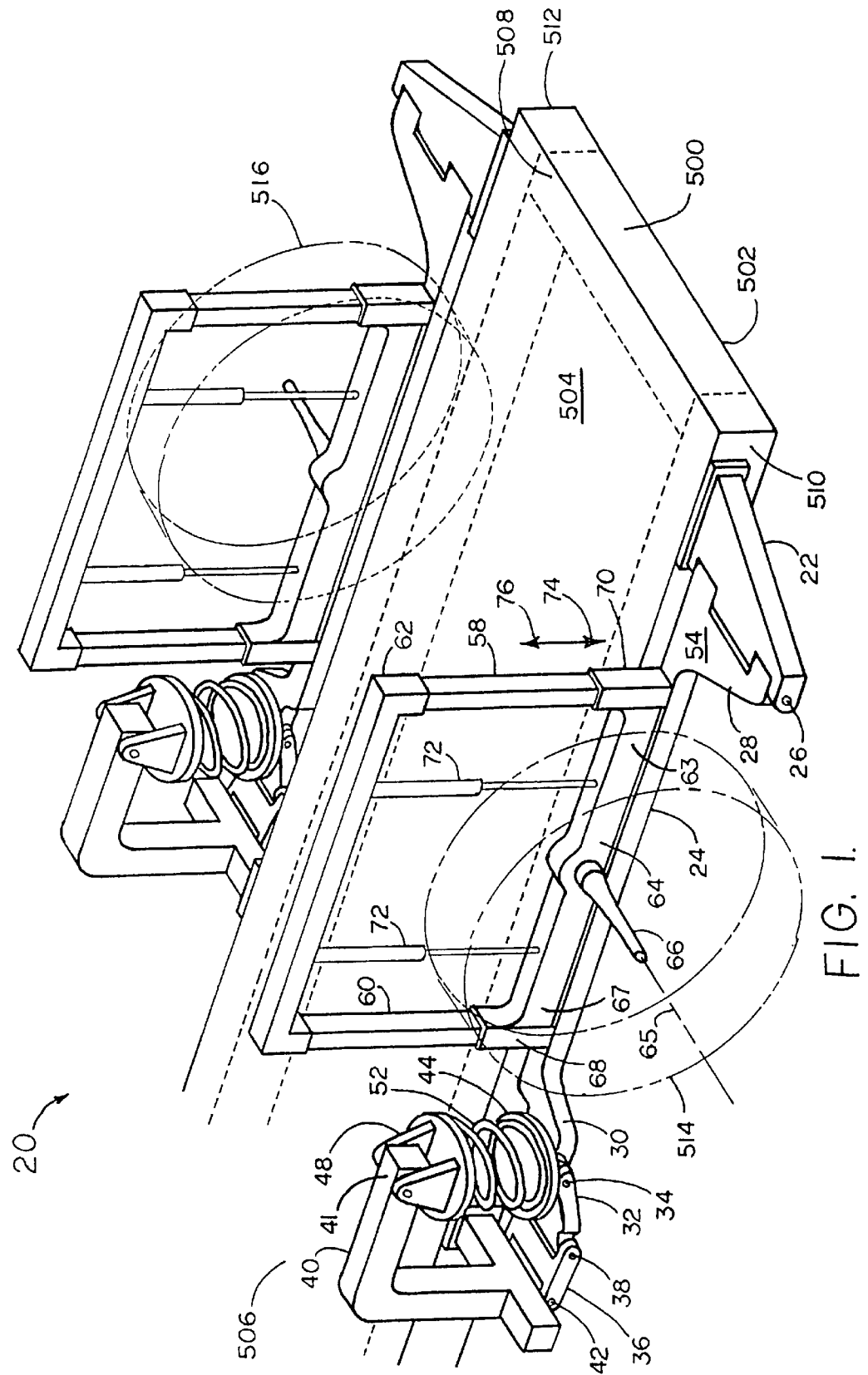
FIG. 1 is a rear perspective view of the suspension system connected to the frame of the vehicle.
Figure 2:
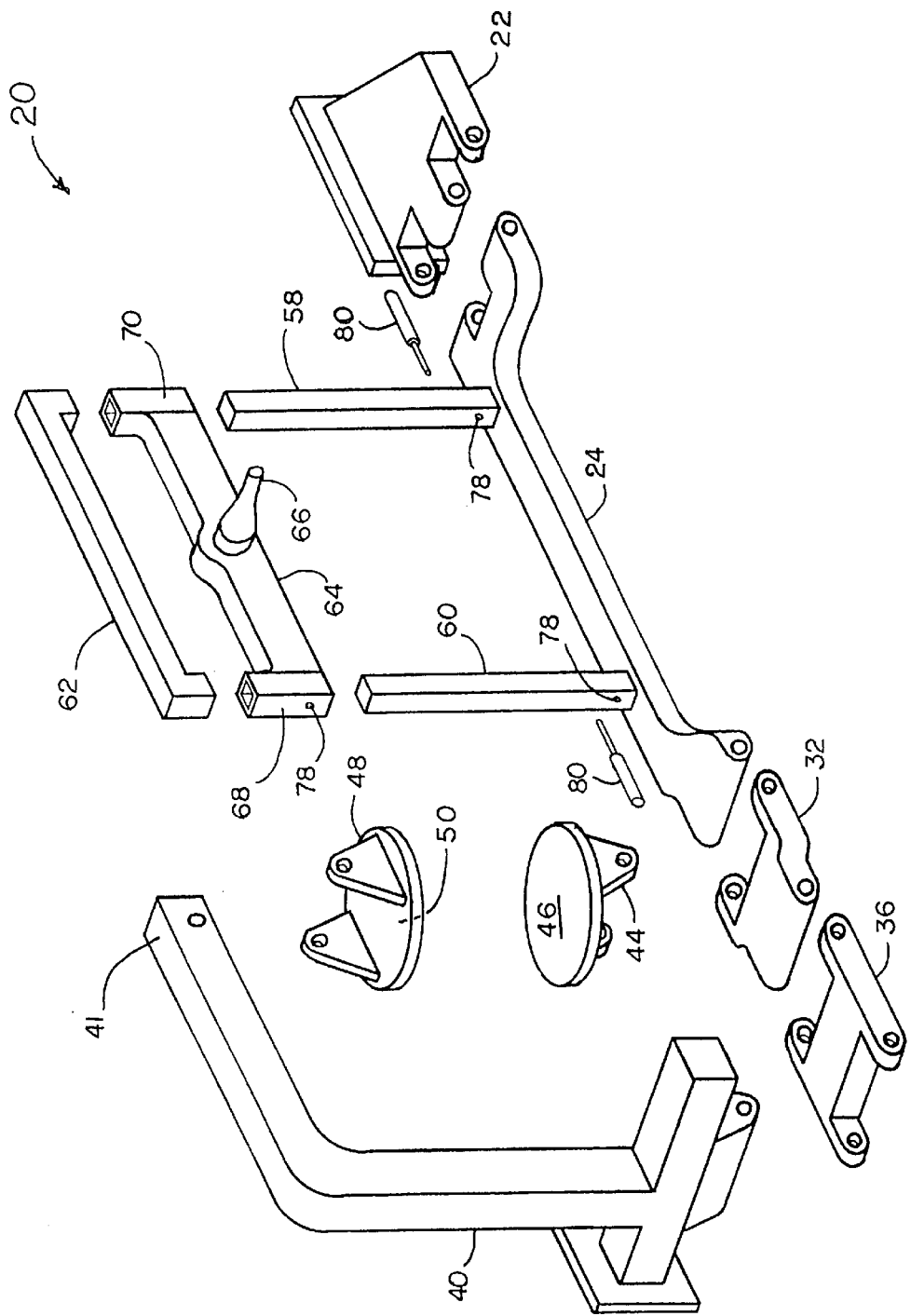
FIG. 2 is a front exploded perspective view of the suspension system.

Referring initially to FIGS. 1 and 2, there is illustrated a rear perspective view of a suspension system connected to the frame of the vehicle, and a front exploded perspective view of the suspension system, in accordance with the present invention, generally designated as 20. The frame 500 of the vehicle, which is not part of the present invention, has a bottom side 502, a top side 504, a front end 506, a rear end 508, a first longitudinal edge 510, and an opposite second longitudinal edge 512. Frame 500 is typically constructed from a plurality of structural members, and supports a cargo-carrying deck. The vehicle further has two wheels 514 and 516 located on opposite sides of frame 500. As will be disclosed in the following discussion, all of the components of the suspension system 20 are mounted on frame 500 so that the components are substantially above bottom side 502 of frame 500, thereby permitting frame 500 to be built as low as roadway conditions will permit. Further, by eliminating all suspension system components from underneath frame 500, the rear end 508 can be selectively lowered to the roadway. In a preferred embodiment, the suspension system 20 components are mounted on first 510 and second 512 longitudinal edges (sides) of frame 500. It is noted that throughout this discussion, the suspension system 20 components for one side of the vehicle are described, these components being adjacent to or connected to first edge 510. It may be readily appreciated that a similar discussion also applies to the suspension system 20 components mounted on opposite edge 512 of frame 500.

Pivot bracket 22 is rigidly attached to frame 500. Control arm 24 with offset clearance for wheel 514 (also not a part of the present invention) is pivotally connected at first end 28 to pivot bracket 22 at pivot point 26, and is oriented substantially parallel to first edge 510. Wheel 514 supports the vehicle upon a roadway which could be the ground, a road, a driveway, etc. Opposite end 30 of control arm 24 is pivotally connected to first control bracket 32 at pivot point 34. First control bracket 32 is pivotally connected to second control bracket 36 at pivot point 38. Second control bracket 36 is pivotally connected to spring tower 40 at pivot point 42. Spring tower 40 is rigidly connected to frame 500, and rises vertically from frame 500. Second end 30 of control arm 24 is also pivotally connected to a first spring saddle 44 having an upwardly facing surface 46. Uppermost end 41 of spring tower 40 is pivotally connected to second spring saddle 48 having a downwardly facing surface 50. A coil suspension spring 52 (or airbag) is connected between upwardly facing surface 46 and downwardly facing surface 50. In the shown embodiment, spring saddles 44 and 48 are located in front of wheel 514. However, it is noted that the spring saddles 44 and 48 could also be located behind wheel assembly 514. That is, the suspension system could be reversed front to back. Also, it is noted that the spring saddles 44 and 48 are in line with the wheel 514 (also refer to FIG. 6), and while being located above bottom side 502 of frame 500, still provide the standard damping features of a conventional suspension system. Since first end 28 of control arm 24 is attached at pivot point 26, opposite end 30 must be allowed to swing through an arc in an up and down direction in order to absorb bumps encountered by the vehicle, but must be prohibited from any lateral movement or twisting. This is accomplished through the use of control brackets 32 and 36. Control brackets 32 and 36 are constructed wide enough to resist twisting or lateral movement. Second control bracket 36 is attached at the lowest point on spring tower 40 at pivot point 42 to allow an up and down hinging movement. First control bracket 32 is attached to control arm 24 at pivot point 34, where first saddle 44 is also attached, and also allows an up and down hinging movement. Control brackets 32 and 36 are attached at pivot point 38 to create a hinged movement at this joint to enable control brackets 32 and 36 to lengthen or reduce the distance between pivot points 34 and 42, while control arm 24 is swinging through an arc centered at pivot point 26. Because control brackets 32 and 36 do not allow any lateral movement of control arm 24, the only movement at second end 30 of control arm 24 is an up and down swing which is absorbed by spring (or airbag) 52. It is noted that control arm 24 is longer than the diameter of wheel 514, and that pivot bracket 22 is located in back of wheel 514, and that spring tower 40 is located in front of wheel 514 (or visa versa).

Control arm 24 has a top surface 54. Top surface 54 has two spaced upwardly projecting legs 58 and 60, leg 58 located near end 28 and leg 60 located near end 30. Cross member 62 caps the top of legs 58 and 60. A spindle arm 64 has a substantially centered spindle 66 which defines a rolling axis 65 to which wheel 514 is rotatably connected. Spindle arm 64 has first end 63 and opposite second end 67. Spindle arm 64 moves independently of control arm 24. Standard elements such as a back plate, brakes, brake drums, disc brakes, air brakes, etc. are used to effect the connection of wheel 514 to spindle 66. It is noted that by connecting wheel 514, and wheel 516 to separate spindle arms 64, the need for an axle running between the wheels 514 and 516 is eliminated. This is important in that it permits cargo to be loaded and unloaded without encountering the encumbrance of an axle.

Spindle arm 64 has two spaced vertical openings or sleeves 68 and 70 which receive and contain legs 60 and 58 of control arm 24, so that legs 60 and 58 can freely slide through sleeves 68 and 70. Sleeves 68 and 70 are located near opposite ends 67 and 63 respectively. A positioning means is connected between cross member 62 and spindle arm 64. The positioning means selectively controls the position of legs 60 and 58 within sleeves 68 and 70, thereby vertically raising or lowering spindle arm 64. In the embodiment shown, the positioning means includes at least one hydraulic cylinder 72 connected between cross member 62 and spindle arm 64. When hydraulic cylinder 72 is retracted it urges cross member 62 toward spindle arm 64 in direction 74, thereby lowering rear end 508 of frame 500 to the roadway (refer also to FIG. 5). Conversely, when hydraulic cylinder 72 is extended, it urges cross member 62 away from spindle arm 64 in direction 76, thereby raising rear end 508 so that frame 500 is substantially horizontal (refer also to FIG. 4). There are many types and manufacturers of hydraulic cylinders that can be used with the present invention. A preferred embodiment includes an industrial standard hydraulic cylinder having a one inch bore and a 12 inch stroke. However, it is noted that other types of positioning means could also be employed, such as jackscrews, scissor jacks, pneumatic devices, etc.

Suspension system 20 further includes a locking means for selectively locking legs 60 and 58 in a fixed position within sleeves 68 and 70. In the embodiment shown, the locking means includes legs 60 and 58 and sleeves 68 and 70 having holes 78 sized to receive a locking pin 80. Holes 78 in sleeve 68 are aligned with holes 78 in leg 60, and locking pin 80 is inserted into the aligned holes so that leg 60 is locked in a fixed position within sleeve 68. Holes 78 are positioned so that when they are so aligned, frame 500 is in a substantially horizontal position. The locking pins 80 can be hydraulically, pneumatically, electrically, or manually operated. Of course, it may be readily appreciated that other forms of locking means such as clamps, brackets, hooks, etc. could also be employed.

Finally, it may be appreciated that the spindle arm 64 and control arm 24 arrangement of the present invention permits frame 500 to be retained in a position below rolling axis 65 of wheel 514, thereby both increasing the height of the cargo space and lowering the center of gravity of the vehicle.

In terms of operation, frame 500 is lowered by retracting the positioning means so that cross member 62 is urged toward spindle arm 64 thereby lowering rear end 508 of frame 500 to the roadway. Conversely, frame 500 is raised by extending the positioning means so that cross member 62 is urged away from spindle arm 64 thereby raising rear end 508 so that frame 500 is substantially horizontal. Once in the raised position, frame 500 is locked in place by inserting locking pin(s) 80 into hole 78 in leg 60 and sleeve 68 so that leg 60 is locked in a fixed position with sleeve 68, and frame 500 is retained in a substantially horizontal position. In a preferred embodiment, locking pins 80 are inserted in each leg-sleeve pair.

By separating the functions of normal suspension system 20 operation and the raising and lowering of the frame 500, the vehicle can be driven with normal expectations and not be affected by a malfunction in the raising and lowering mechanism. Should the hydraulic system fail, and not allow the frame to be lowered, the vehicle can still drive in a normal fashion unaffected by the failure of the hydraulics. Should the hydraulics fail when the frame 500 is in the lowered position, the frame 500 can still be raised by other mechanical means, and manually locked so that the vehicle can still be driven in the normal fashion. Should the spring or airbag 52 fail, control brackets 32 and 36 will not allow the control arm 24 to swing high enough in its arc to allow the frame 500 to drop low enough to unintentionally engage the roadway at driving speeds, thereby protecting against the possibility of an accident. In this capacity, the vehicle can still be driven safely from the roadway where repairs can be made. If there is a hydraulic failure, the vehicle can still be driven, regardless, and if the raising and lowering function is still needed, it can be performed by manual means and manually re-locked for driving purposes.

Since the suspension system 20 can be utilized upon vehicles which use public roadways, it is necessary that all components be fabricated from structurally sound materials, using proper machining and assembly processes. To that end in a preferred embodiment, the suspension system 20 components are fabricated from forged or case hardened steel. It is noted however, that numerous other materials could also be employed, so long as structural integrity is maintained.

Figure 3:
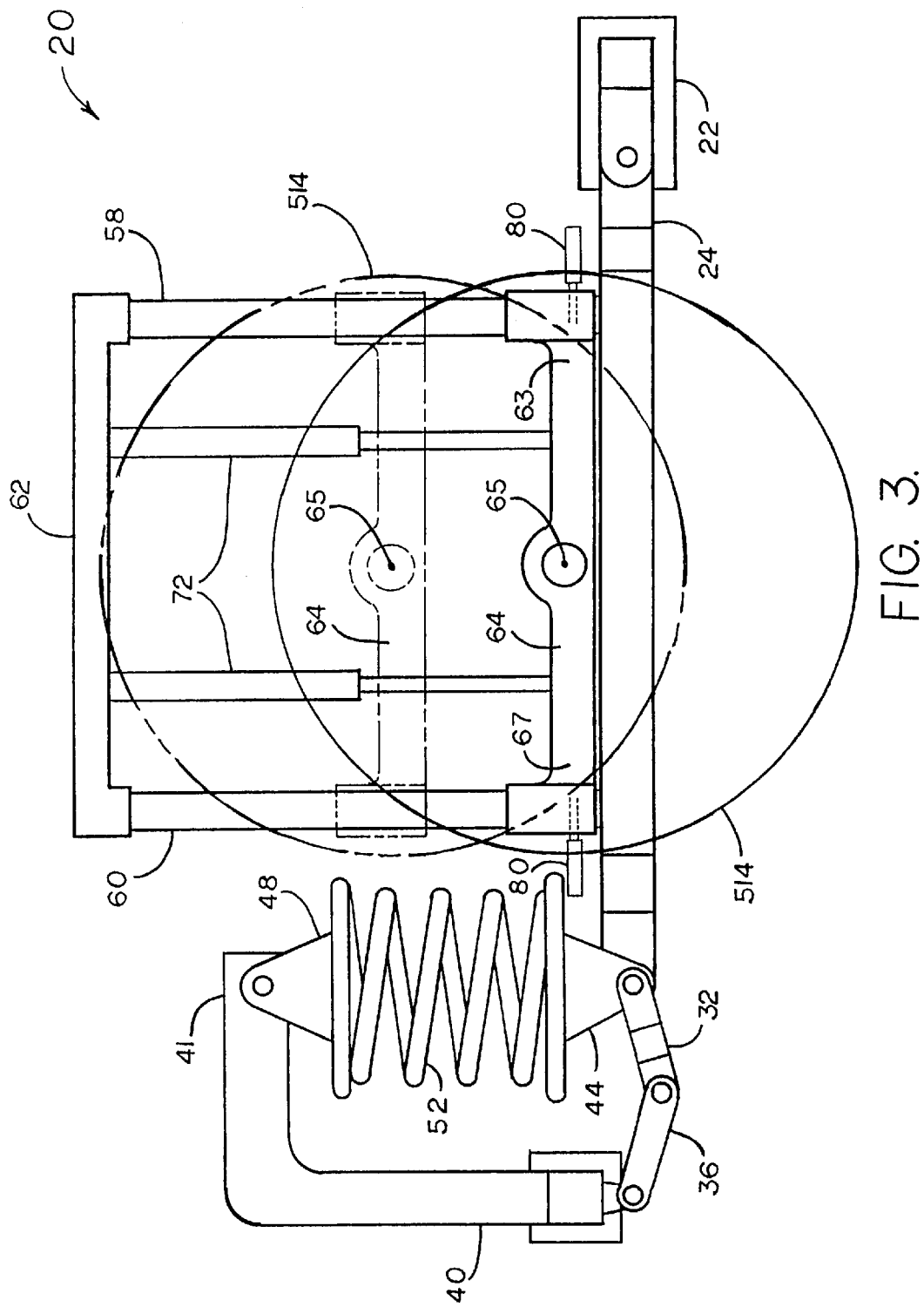
FIG. 3 is a side elevation view of the suspension system in accordance with the present invention showing the position of the wheel of the vehicle when the suspension system is in the raised position (solid), and when the suspension system is lowered (broken)

FIG. 3 is a side elevation view of the suspension system in accordance with the present invention showing the position of the wheel 514 of the vehicle and the spindle arm 64 when the suspension system 20 is in the raised position (solid), and when the suspension system 20 is lowered (broken).

FIG. 4 is a reduced side elevation view of the vehicle and suspension system 20, showing the frame 500 in the raised position. Hydraulic cylinders 72 have been extended causing cross member 62 to move away from spindle arm 64 in direction 74.

FIG. 5 is a reduced side elevation of the vehicle and suspension system 20, showing the frame 500 in the lowered position. Hydraulic cylinders 72 have been retracted causing cross member 62 to move toward spindle arm 64 in direction 76.

FIG. 6 is a split top plan view and bottom plan view of suspension system 20, showing the location of the various components.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. An independent suspension system for a vehicle, the vehicle residing upon a roadway, the vehicle having a frame having a front end and an opposite rear end, the frame further having a top side and an opposite bottom side, the frame further having a first longitudinal edge and an opposite second longitudinal edge, said suspension system comprising:

a plurality of components, said components mounted on the frame such that all said components are situated substantially above the bottom side of the frame thereby permitting the rear end of the frame to be selectively lowered to the roadway;

said suspension system including a raising and lowering means for selectively lowering the rear end of the frame to the roadway and raising the rear end so that the frame is substantially horizontal;

said suspension system further including first and second control arms, said first control arm pivotally connected to the frame adjacent to the first edge, said first control arm oriented substantially parallel to the first edge, said second control arm pivotally connected to the frame adjacent to the second edge, and said second control arm oriented substantially parallel to the second edge;

said first control arm further including a first end and an opposite second end, said first end pivotally connected to a pivot bracket, said pivot bracket connected to the frame; and, said second end of said first control arm pivotally connected to a first control bracket, said first control bracket pivotally connected to a second control bracket, said second control bracket pivotally connected to a spring tower, said spring tower connected to the frame, said spring tower rising vertically from the frame.

2. A suspension system according to claim 1, said second end of said first control arm also pivotally connected to a first spring saddle, said first spring saddle having an upwardly facing surface, said spring tower having an uppermost end, said uppermost end pivotally connected to a second spring saddle, said second spring saddle having a downwardly facing surface, a suspension spring connected between said upwardly and downwardly facing surfaces.

3. An independent suspension system for a vehicle, the vehicle residing upon a roadway, the vehicle having a frame having a front end and an opposite rear end, the frame further having a top side and an opposite bottom side, the frame further having a first longitudinal edge and an opposite second longitudinal edge, said suspension system comprising:

a plurality of components, said components mounted on the frame such that all said components are situated substantially above the bottom side of the frame thereby permitting the rear end of the frame to be selectively lowered to the roadway;

said suspension system including a raising and lowering means for selectively lowering the rear end of the frame to the roadway and raising the rear end so that the frame is substantially horizontal;

said suspension system further including first and second control arms, said first control arm pivotally connected to the frame adjacent to the first edge, said first control arm oriented substantially parallel to the first edge, said second control arm pivotally connected to the frame adjacent to the second edge, and said second control arm oriented substantially parallel to the second edge;

the vehicle further having a first wheel located near the first longitudinal edge of the frame, said raising and lowering means further including:
said first control arm having a top surface;
two spaced legs projecting upwardly from said surface and capped by a cross member;
a spindle arm having a substantially centered spindle, the first wheel rotatably connected to the spindle, said spindle arm having a first end and an opposite second end, said spindle arm having two spaced sleeves, one said sleeve located near said first end and the other said sleeve located near said second end, said sleeves receiving and containing said legs so that said legs can freely slide through said sleeves; and,
a positioning means connected between said cross member and said spindle arm, said positioning means selectively controlling the position of said legs within said sleeves, thereby vertically raising or lowering said first control arm.

4. A suspension system according to claim 3, said positioning means further including at least one hydraulic cylinder connected between said cross member and said spindle arm, so that when said hydraulic cylinder is retracted it urges said cross member toward said spindle arm thereby lowering the rear end of the frame of the vehicle to the roadway.

5. A suspension system according to claim 3, said positioning means further including at least one hydraulic cylinder connected between said cross member and said spindle, so that when said hydraulic cylinder is extended it urges said cross member away from said spindle arm thereby raising the rear end so that the frame is substantially horizontal.

6. A suspension system according to claim 3, further including a locking means for selectively locking said legs in a fixed position within said sleeves.

7. A suspension system according to claim 6, said locking means further including said sleeves and said legs having holes sized to receive a locking pin, said locking pin sized for insertion into said holes in said legs and said sleeves so that said legs are locked in a fixed position within said sleeves.

8. An independent suspension system for a vehicle, the vehicle residing upon a roadway, the vehicle having a frame having a front end and an opposite rear end, the frame further having a top side and an opposite bottom side, the frame further having a first longitudinal edge and an opposite second longitudinal edge, said suspension system comprising:

a plurality of components, said components mounted on the frame such that all said components are situated substantially above the bottom side of the frame thereby permitting the rear end of the frame to be selectively lowered to the roadway;

said suspension system including a raising and lowering means for selectively lowering the rear end of the frame to the roadway and raising the rear end so that the frame is substantially horizontal;

the vehicle further having a first wheel located near the first longitudinal edge of the frame, said suspension system further including:
a first control arm pivotally connected to the frame adjacent to the first edge, said first control arm oriented substantially parallel to the first edge;
said raising and lowering means further including:
said control arm having a top surface;
two spaced legs projecting upwardly from said surface and capped by a cross member;
a spindle arm having a substantially centered spindle, the first wheel rotatably connected to the spindle, said spindle arm having a first end and an opposite second end, said spindle arm having two spaced sleeves, one said sleeve located near said first end and the other said sleeve located near said second end, said sleeves receiving and containing said legs so that said legs can freely slide through said sleeves; and,
a positioning means connected between said cross member and said spindle arm, said positioning means selectively controlling the position of the legs within said sleeves, thereby vertically raising or lowering said control arm.

9. A method for lowering and raising a frame of a vehicle, comprising the steps of:

providing the vehicle residing upon a roadway, the vehicle having a frame having a front end and an opposite rear end, the frame further having a top side and an opposite bottom side, the frame further having a first longitudinal edge, the vehicle further having a first wheel located near the first longitudinal edge;

further providing an independent suspension system comprising a first control arm, said first control arm having a top surface, two spaced legs projecting upwardly from said surface and capped by a cross member, a spindle arm having a spindle, the first wheel rotatably connected to the spindle, said spindle arm having a first end and an opposite second end, said spindle arm having two spaced sleeves, one said sleeve located near said first end and the other said sleeve located near said second end, said sleeves receiving and containing said legs so that said legs can freely slide through said sleeves, and a positioning means connected between said cross member and said spindle arm, said positioning means selectively controlling the position of said legs within said sleeves, thereby vertically raising or lowering said control arm;

retracting said positioning means so that said cross member is urged toward said spindle arm thereby lowering the rear end of the frame of the vehicle to the roadway.

10. The method according to claim 9, further including the step of:

extending said positioning means so that said cross member is urged away from said spindle arm thereby raising the rear end so that the frame is substantially horizontal.

11. The method according to claim 10, further including the steps of:

providing said sleeves and said legs with holes sized to receive a locking pin;

inserting said locking pin into said holes so that said legs are locked in a fixed position within said sleeves, thereby retaining the frame in a substantially horizontal position.

12. An independent suspension system for a vehicle, the vehicle residing upon a roadway, the vehicle having a frame having a front end and an opposite rear end, the frame further having a first longitudinal edge and an opposite second longitudinal edge, the vehicle further having a plurality of wheels, said suspension system comprising:

a first control arm connected to the frame adjacent to the first longitudinal edge;

a second control arm connected to the frame adjacent to the second longitudinal edge;

a first spindle arm slidably connected to said first control arm, said first spindle arm receiving a wheel, said first spindle arm disposed above said first control arm; and, a second spindle arm slidably connected to said second control arm, said second spindle arm receiving a wheel, said second spindle arm disposed above said second control arm.

13. An independent suspension system according to claim 12, further including:

said first control arm having a first end and an opposite second end, said first and second ends pivotally connected to the frame, said first control arm oriented substantially parallel to the frame; and, said second control arm having a first end and an opposite second end, said first and second ends pivotally connected to the frame, said second control arm oriented substantially parallel to the frame.

14. An independent suspension system according to claim 12, further including:

said first control arm vertically positionable in relation to said first spindle arm; and, said second control arm vertically positionable in relation to said second spindle arm.

15. An independent suspension system according to claim 14, further including:

a first positioning means connected between said first control arm and said first spindle arm, said first positioning means controlling the vertical movement of said first control arm in relation to said first spindle arm;

a second positioning means connected between said second control arm and said second spindle arm, said second positioning means controlling the vertical movement of said second control arm in relation to said second spindle arm; and, so that by selectively retracting or extending said positioning means, the rear end of the frame is (1) lowered to the roadway, or (2) raised to a substantially horizontal position, respectively.

16. A suspension system according to claim 15, said first and second positioning means each including at least one hydraulic cylinder.

17. An independent suspension system for a vehicle, the vehicle residing upon a roadway, the vehicle having a frame having a front end and an opposite rear end, the frame further having a top side and an opposite bottom side, the frame further having a first longitudinal edge and an opposite second longitudinal edge, the vehicle having a plurality of wheels having a width, said suspension system comprising:

first and second control arms, said first control arm pivotally connected to the frame adjacent to the first edge, said first control arm oriented substantially parallel to the first edge, said second control arm pivotally connected to the frame adjacent to the second edge, and said second control arm oriented substantially parallel to the second edge;

said first and second control arms each having an offset clearance for accepting a wheel;

a first pivot bracket and a first control bracket connecting opposite ends of said first control arm to the frame;

a second pivot bracket and a second control bracket connecting opposite ends of said second control arm to the frame;

a first suspension spring connected between (1) a pivotal connection of said first control arm and said first control bracket, and (2) the frame of the vehicle; and, a second suspension spring connected between (1) a pivotal connection of second control arm and said second control bracket, and (2) the frame of the vehicle.

* * * * *